B. BROOKS.
CYCLE, MOTOR CYCLE, AND ANALOGOUS SADDLE AND SEAT.
APPLICATION FILED JULY 24, 1914.
1,128,940.
Patented Feb. 16, 1915.
5 SHEETS—SHEET 4.
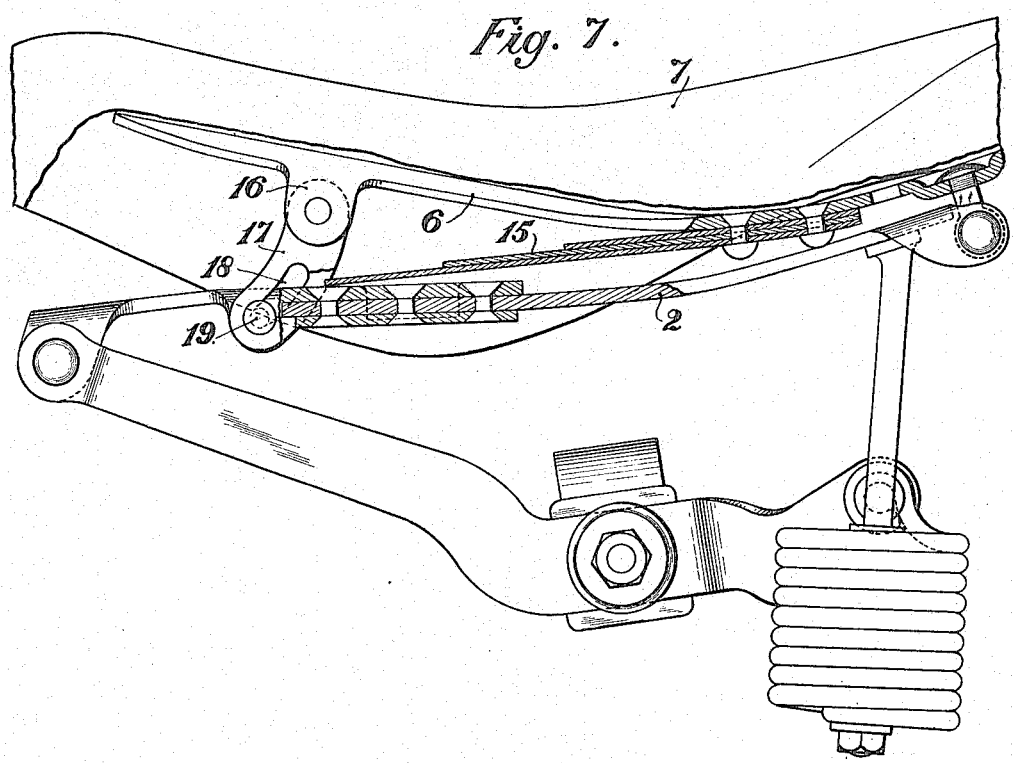
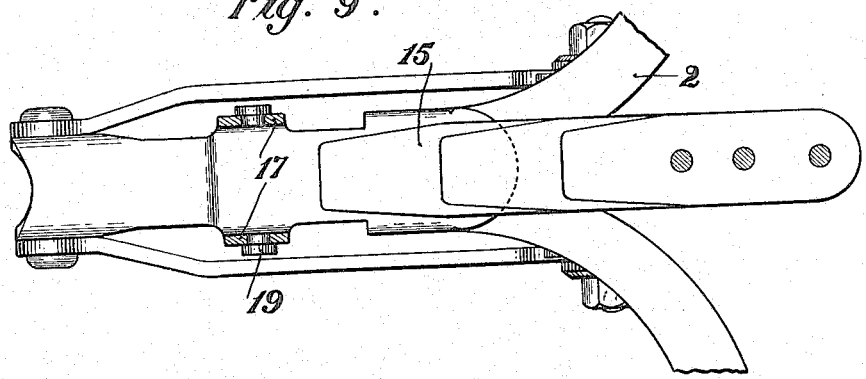
WITNESSES
INVENTOR Boultbee Brooks
by James L. Norris
Attorney

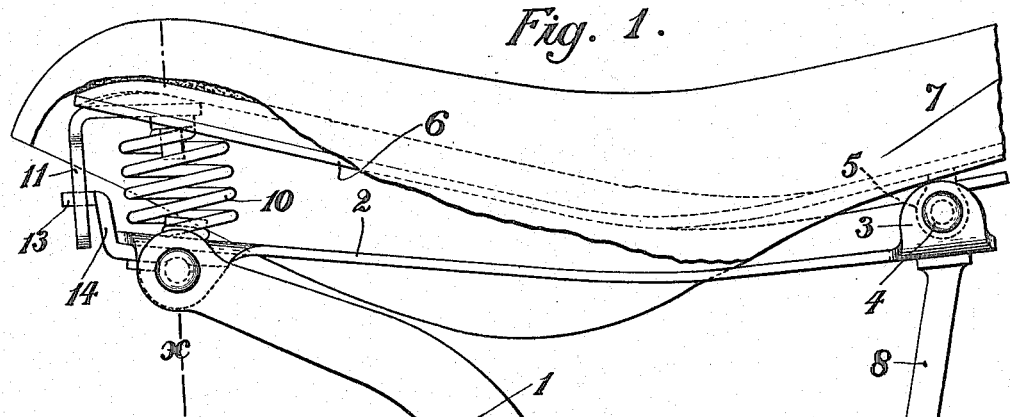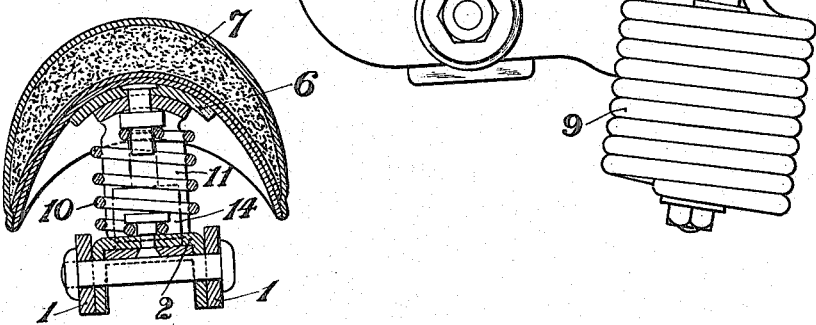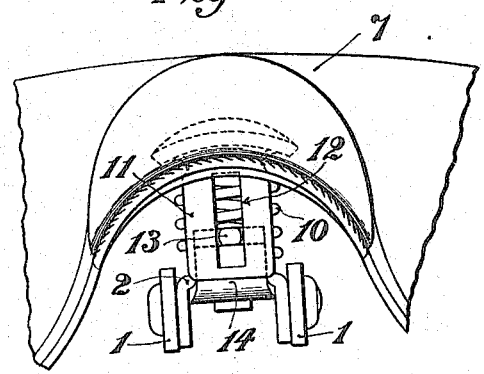

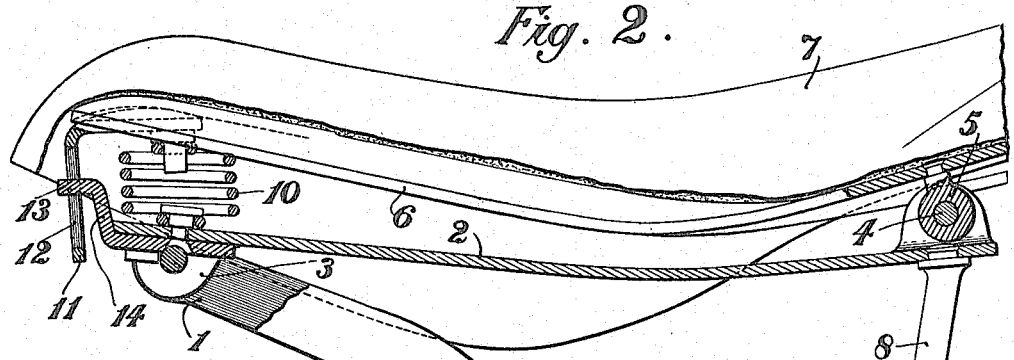
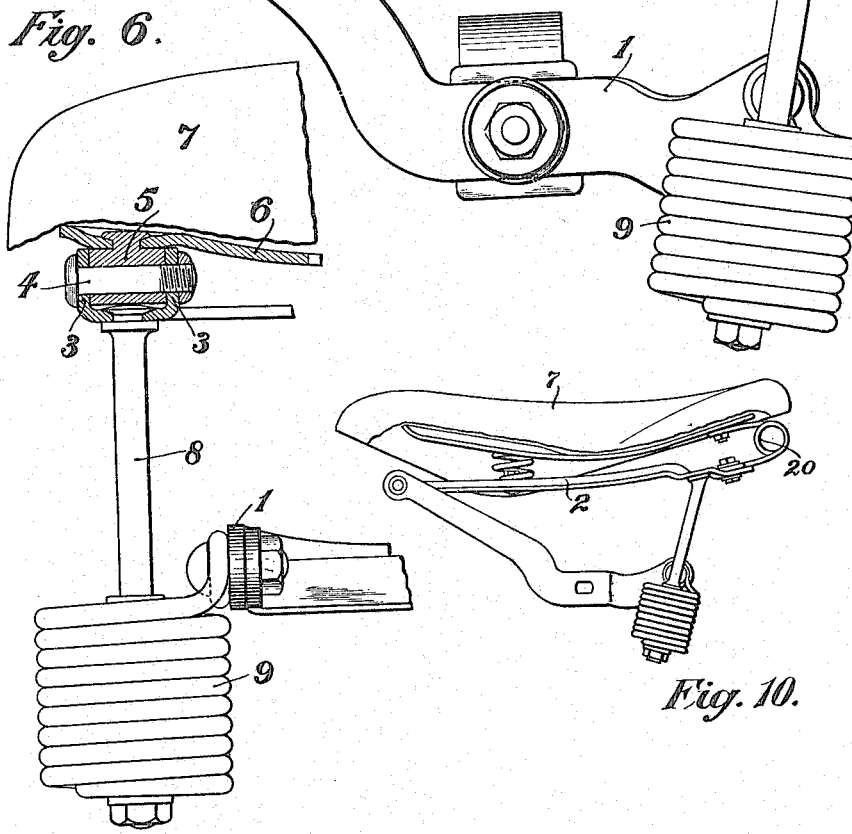

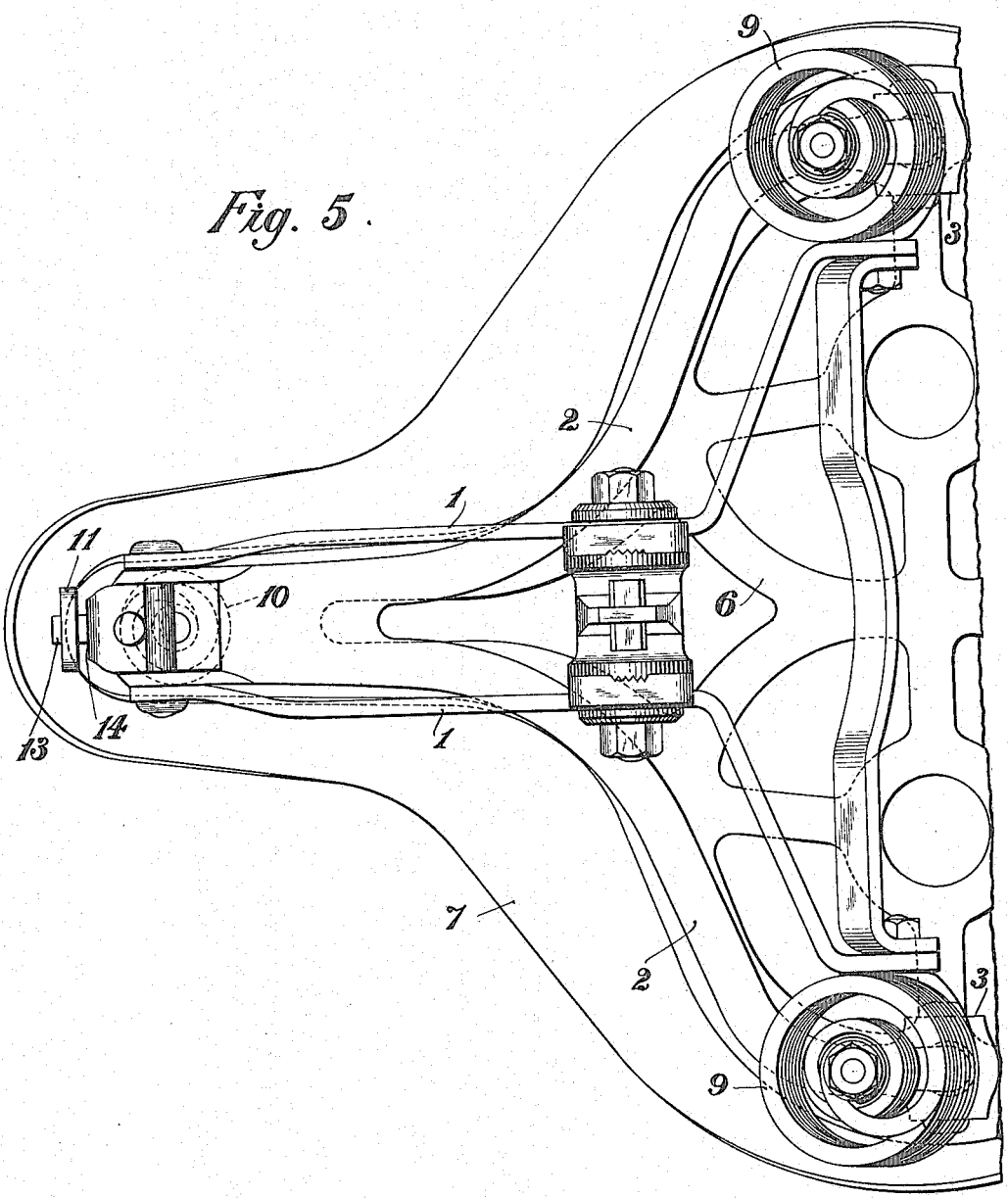

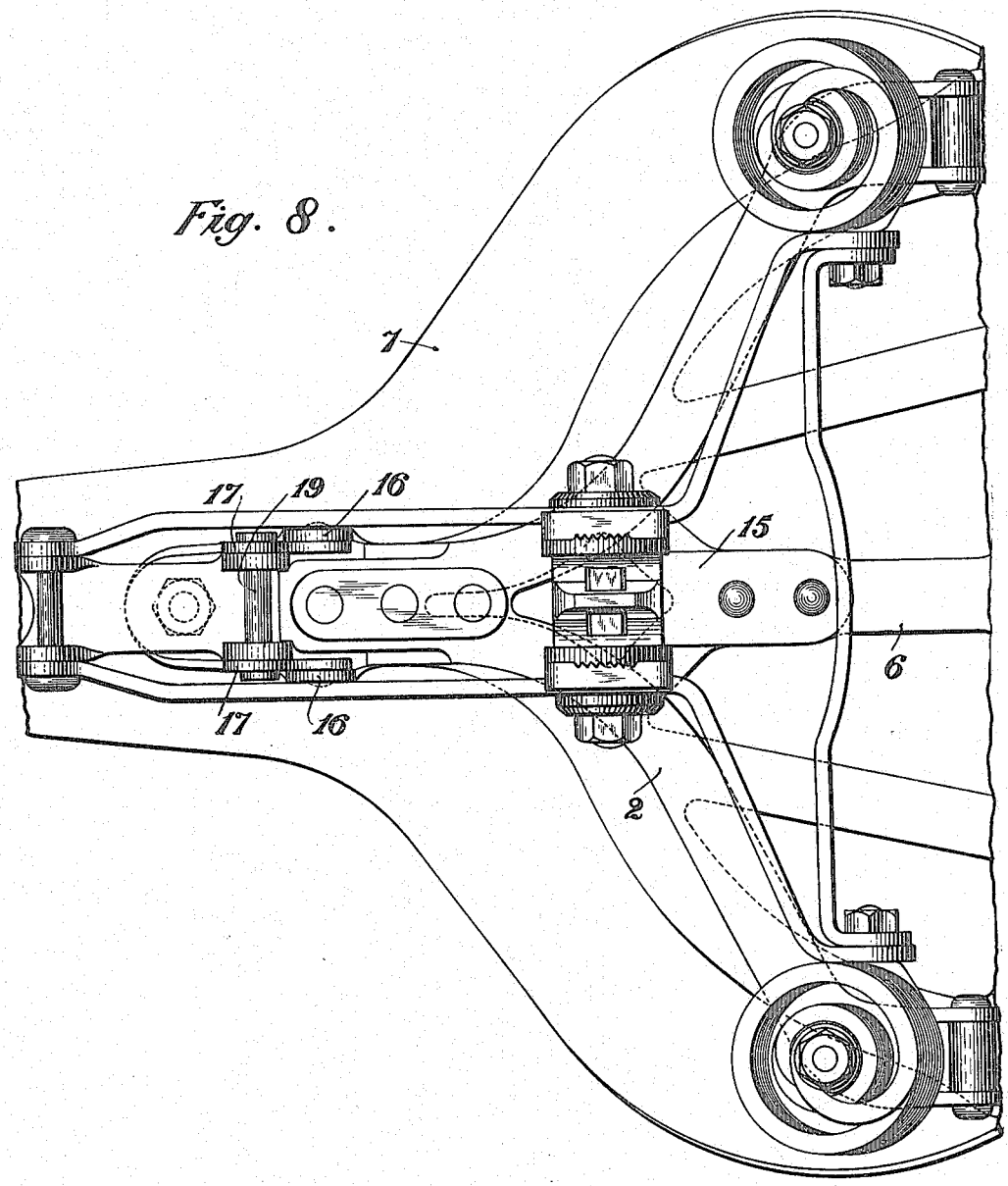

UNITED STATES PATENT OFFICE.

BOULTBEE BROOKS, OF BIRMINGHAM, ENGLAND.

CYCLE, MOTOR-CYCLE, AND ANALOGOUS SADDLE AND SEAT.

1,128,940.   Specification of Letters Patent.   Patented Feb. 16, 1915.

Application filed July 24, 1914. Serial No. 852,860.

*To all whom it may concern:*

Be it known that I, BOULTBEE BROOKS, subject of the King of Great Britain, residing at Criterion Works, Great Charles street, Birmingham, England, have invented certain new and useful Improvements in Cycle, Motor-Cycle, and Analogous Saddles and Seats, of which the following is a specification.

This invention relates to cycle, motor-cycle and analogous saddles and seats of the type comprising a rigid seat top supported at its rear end by a system of springs connected to or operated by a radius rod or member arranged beneath the seat top and hinged at its forward end to the base bracket, so as to prevent displacement of the rear springs from their normal line of action or arc of movement and thus insure the most efficient working of said springs under all conditions and with the rider seated in any position upon the saddle, either forward or rearward of the normal position.

The object of the present invention is to provide means for resiliently supporting the peak or front portion of the above type of saddle while retaining all the advantages referred to attendant upon the use of the radius rod.

The invention consists in hingedly mounting the rigid seat top at its rear end upon the radius member (which is in the form of a supplementary under seat-frame) and interposing a spring or springs between the said seat top and the radius member in order to resiliently support the front of the seat, a suitable stop device being provided, if necessary, for limiting the relative vertical movement between the said seat and base frame. The radius member or supplementary seat frame, being directly connected between the front of the base frame and the hanger rods which operate the rear springs, prevents distortion or angular displacement of the said springs, while the seat, being hingedly mounted upon the supplementary frame, acts as a radius rod for preventing distortion or displacement of the front spring, especially when the latter is of the coiled type.

Figure 1. of the accompanying drawings represents a side elevation of a motor-cycle saddle constructed in accordance with this invention. Fig. 2. is a longitudinal section through the said saddle showing the front spring compressed. Fig. 3. illustrates a vertical section on line X, Fig. 1. Fig. 4. is a front view of the peak of the saddle, showing the stop arrangement employed in conjunction with the front spring. Fig. 5. shows an underside plan of the saddle. Fig. 6. is a section showing how the seat top is hinged to the supplementary under frame. Fig. 7. represents a sectional side elevation of a modification. Fig. 8. illustrates an underside plan of this modification. Fig. 9. is a topside plan showing how the leaf spring bears upon the supplementary under frame. And Fig. 10 shown a side elevation of a further modification in which loop coils are used instead of pivots for connecting the seat top to the radius member.

Referring to Figs. 1 to 6, hinged at one end to the forward extremity of the usual base bracket 1. of the saddle is a supplementary seat-frame or radius member 2. which is forked or divided at about its middle and the pair of arms or branches spread out laterally, their extremities being provided with bent-up ears 3. by which they are jointed at 4 to lugs 5. carried upon each side of the seat-plate 6. which is bolted or otherwise fixed to the underside of the rigid seat top 7. in the usual manner. The extremities of the said arms or branches of the frame 2. also carry depending hanger rods 8. connected at their lower ends to coiled springs 9. (preferably of the compound tension and compression type) suspended from the base bracket 1. Interposed between the said supplementary or under seat frame 2. and the underside of the seat plate proper 6, at the extreme peak of the saddle, is a coiled spring 10, and in order to limit the vertical movement of the seat top 1. a stop device is provided comprising a depending front plate 11. carried by the seat plate 6. and provided with a vertical slot 12. engaged by a lug 13. carried by a bracket 14. fixed to or formed out of the forward end of the supplementary frame 2. On the peak or forward end of the saddle being forced downward the spring 10 is rendered active and absorbs any shock or vibration and prevents same from being transmitted to the rider. If desired the slotted part may be carried by the frame 2. and the engaging lug by the seat top.

In the modification represented in Figs. 7 to 9, instead of the peak of the saddle being supported by a coiled spring, there is interposed between the frame 2. and the underside of the seat plate 6. a centrally and longitudinally disposed laminated leaf spring 15. The rear end of the said spring being fixed to the seat plate 6, while its forward end is arranged to bear upon the forward part of the supplementary frame 2. In order to form a stop device for limiting the vertical movement of the seat 7. the plate 6. is provided upon its underside and preferably near its forward end, with a pair of laterally separated depending ears 16. to which are jointed a pair of links 17. whose ends are arranged to come one upon each side of the supplementary frame, the said ends being formed with longitudinal slots 18 which are engaged by the ends of a transverse pin 19 carried by and fixed to the said frame 2. Also, as shown in Fig. 10, instead of pivots being employed for hinging the seat top 7 to the radius member 2. loop coils of wire 20 may be used. Any other suitable form of stop device may be employed for limiting the relative vertical movement between the seat plate and base bracket.

Having fully described my invention, what I desire to claim and secure by Letters Patent is:—

1. A motor-cycle, cycle or analogous saddle or seat comprising a base framing, a rigid seat top, a supplementary under seat frame separate from the seat top and directly hinged to the front of the base framing, said seat top being hinged at its rear end to the supplementary seat frame, depending hanger rods carried by the latter, coiled springs suspended from the base framing and connected to the lower ends of the hanger rods, and springs interposed between the seat top and the supplementary seat frame.

2. A motor-cycle, cycle or analogous saddle or seat comprising a base framing, a rigid seat top, a supplementary under seat frame separate from the seat top and directly hinged to the front of the base framing, said seat top being hinged at its rear end to the supplementary seat frame, rear load-supporting springs connected to the said supplementary seat frame and to the base framing, a resilient device interposed between the seat top and the supplementary seat frame, and a stop device for limiting the upward movement of the seat top relatively to the said supplementary seat frame.

3. A motor-cycle, cycle or analogous saddle or seat comprising a base framing, a rigid seat top, a supplementary under seat frame separate from the seat top and directly hinged to the front of the base framing, said seat top being hinged at its rear end to the supplementary seat frame, rear load-supporting springs connected to the said supplementary seat frame and to the base framing, a resilient device interposed between the seat top and the supplementary seat frame, and a stop device for limiting the relative movement between the seat top and supplementary seat frame comprising a slotted member carried by the one part engaged by a projection carried by the other part.

In testimony whereof I have hereunto set my hand in presence of two subscribing witnesses.

BOULTBEE BROOKS.

Witnesses:
HENRY NORTON SKERRETT,
WILLIAM STAITES SKERRETT.

Copies of this patent may be obtained for five cents each, by addressing the "Commissioner of Patents, Washington, D. C."